(12) United States Patent
Sato

(10) Patent No.: US 8,040,782 B2
(45) Date of Patent: Oct. 18, 2011

(54) WAVELENGTH-SELECTIVE LIGHT-SHIELDING ELEMENT AND OPTICAL HEAD USING THE SAME

(75) Inventor: Hiromasa Sato, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 228 days.

(21) Appl. No.: 12/371,981

(22) Filed: Feb. 17, 2009

(65) Prior Publication Data

US 2009/0154322 A1 Jun. 18, 2009

Related U.S. Application Data

(63) Continuation of application No. PCT/JP2007/065853, filed on Aug. 14, 2007.

(30) Foreign Application Priority Data

Aug. 15, 2006 (JP) .................................. 2006-221562

(51) Int. Cl.
*G11B 7/135* (2006.01)
(52) U.S. Cl. ................................. 369/112.22
(58) Field of Classification Search .......................... None
See application file for complete search history.

(56) References Cited

U.S. PATENT DOCUMENTS

| | | | | |
|---|---|---|---|---|
| 5,450,376 | A * | 9/1995 | Matsumura et al. | 369/13.32 |
| 6,721,258 | B1 * | 4/2004 | Hashimoto | 369/112.16 |
| 2001/0038577 | A1 * | 11/2001 | Chang et al. | 369/13 |
| 2006/0239171 | A1 * | 10/2006 | Ooi et al. | 369/112.16 |
| 2007/0223348 | A1 * | 9/2007 | Sasaki | 369/103 |
| 2007/0274188 | A1 * | 11/2007 | Kikuchi | 369/112.01 |
| 2009/0009859 | A1 * | 1/2009 | Kawai et al. | 359/386 |
| 2009/0154322 | A1 * | 6/2009 | Sato | 369/110.01 |

FOREIGN PATENT DOCUMENTS

| | | |
|---|---|---|
| JP | 9-281330 | 10/1997 |
| JP | 2001-242315 | 9/2001 |
| JP | 2001-305326 | 10/2001 |
| JP | 2003-149426 | 5/2003 |
| JP | 2004-503046 | 1/2004 |
| JP | 2005-203090 | 7/2005 |
| JP | 2005-209327 | 8/2005 |

OTHER PUBLICATIONS

Kikuchi, WO 2005/101392 A1, published Oct. 27, 2005.*
U.S. Appl. No. 12/574,131, filed Oct. 6, 2009, Murata, et al.

* cited by examiner

*Primary Examiner* — Peter Vincent Agustin
(74) *Attorney, Agent, or Firm* — Oblon, Spivak, McClelland, Maier & Neustadt, L.L.P.

(57) ABSTRACT

In order to provide a wavelength-selective light-shielding element capable of blocking circularly-polarized light beams rotating in a specific direction among light beams whose wavelengths falling in a specific range, a light-shielding region is provided in a portion of a transparent substrate, wherein the light-shielding region permits passage of first circularly-polarized light rotating in a first direction regardless of a wavelength of the first circularly-polarized light and blocks second circularly-polarized light beams whose wavelengths falling within a predetermined range, among second circularly-polarized light beams rotating in the second direction, to thus permit passage of the second circularly-polarized light beams falling outside the predetermined range.

11 Claims, 11 Drawing Sheets

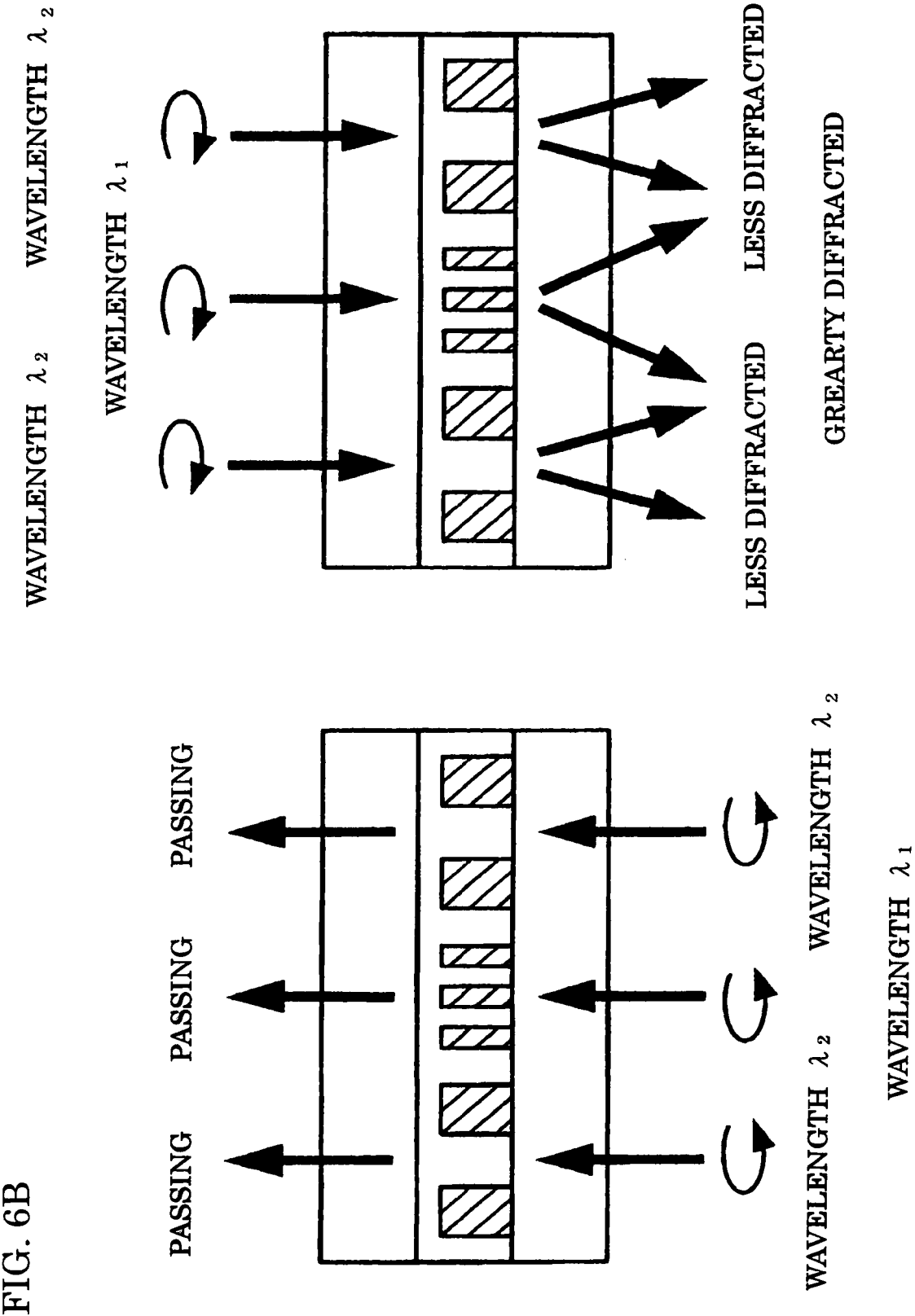

WAVELENGTH-SELECTIVE LIGHT-SHIELDING ELEMENT AND OPTICAL HEAD USING THE SAME

TECHNICAL FIELD

The present invention relates to a light-shielding element and an optical head using the same, and more particularly, a wavelength-selective light-shielding element capable of blocking circularly-polarized light beams rotating in a specific direction among light beams in a specific wavelength range as well as to an optical head using the element.

BACKGROUND ART

In addition to an optical disk having a single recording layer as in a CD, a multilayer optical disk having a plurality of recording layers for increasing recording capacity as in a DVD and a high-density DVD has come to be used. However, when information is read (hereinafter called "reproduced") from a recording layer of the multilayer optical disk, stray light reflected from a recording layer not to be subjected to reproduction (a non-reproduction layer) as well as information light reflected from a recording layer to be subjected to reproduction (a reproduction layer) enter a photodetector. Therefore, interference between the information light and the stray light sometimes leads to deterioration of the accuracy of reproduction.

FIGS. 8A and 8B are ray diagrams achieved when a DVD 808 having two recording layers is subjected to reproduction. FIG. 8A shows a light path of light reflected when a first recording layer 809 close to a light incidence plane is subjected to reproduction, and FIG. 8B shows a light path of light reflected when a second recording layer 810 distant from the light incidence plane is subjected to reproduction.

Specifically, the light reflected by the DVD 808 passes through an objective lens 804 and a collimator lens 803, to thus enter a photodetector 805.

As shown in FIG. 8A, light-source light emitted from the light source comes into a focus on the first recording layer 809 at the time of reproduction of data in the first recording layer 809, and the light-source light reflected from the first recording layer 809 turns into information light 801 and converges on a photodetector 805. However, the light-source light does not come into a focus on a second recording layer 810, the light-source light reflected from the second recording layer 810 turns into stray light 802 and converges on a position ahead of the photodetector 805 and does not converge on the photodetector 805; however, a portion of the stray light enters the photodetector 805.

Further, when the second recording layer 810 is subjected to reproduction as shown in FIG. 8B, the light-source light comes into a focus on the second recording layer 810, and hence the information light 801 reflected from the second recording layer 810 converges on the photodetector 805. However, the light-source light does not come into a focus on the first recording layer 809, the stray light 802 reflected from the first recording layer 809 converges on a location behind the photodetector 805. Hence, the stray light does not converge on the photodetector 805, but a portion of the stray light enters the photodetector 805.

Consequently, the information light reflected from the reproduction layer and the stray light reflected from the non-reproduction layer interfere with each other within the photodetector 805; hence, deterioration of the accuracy of reproduction is unavoidable.

In order to enhance the accuracy of reproduction, there has already been proposed an optical member used for diminishing the interference between the information light reflected from the reproduction layer and the stray light reflected from the non-reproduction layer (see; for instance, JP-A-2005-203090).

As will be shown in FIG. 9A, an optical member 9 of the proposal has a hologram area 91 that is formed in a center portion of an effective region 901 and is essentially identical with the photodetector 805 in terms of an outer shape.

The light-source light is reflected by the reproduction layer, to thus turn into information light; and is reflected by the non-reproduction layer, to thus turn into stray light. The information light and the stray light that enter the hologram area 91 of the optical member 9 undergo diffraction in the hologram area 91 and do not enter the photodetector 805.

Consequently, as shown in FIG. 9B, the area of the photodetector 805 is not exposed to the stray light 802 within the plane of the photodetector 805, and the stray light diffuses into a circumference 94 of the photodetector 805.

In the meantime, the information light 801 entered the hologram area 91 undergoes diffraction in the hologram area 91, to thus fail to reach the photodetector 805. However, the information light 801 transmitted through an area other than the hologram area 91 creates spots 93 on three cells 92 of the photodetector 805. Therefore, the information light 801 and the stray light 802 does not interfere with each other within the photodetector 805, and the accuracy of reproduction of the multilayer optical disk can be enhanced.

However, in the optical member of the proposal, the hologram area 91 diffracts the information light 801 and the stray light 802 regardless of a wavelength. When an optical disk (e.g., a CD) having a single recording layer which does not require prevention of interference is subjected to reproduction, information light that has a high density of light and that is acquired in the vicinity of an optical axis is lost, which raises a problem of a decrease in a utilization ratio of light. An optical element may also be retracted from an optical path at the time of reproduction of an optical disk during which prevention of interference is not required. However, there must be provided a mechanism that inserts and retracts an optical element according to the type of an optical disk to be subjected to reproduction.

DISCLOSURE OF THE INVENTION

Accordingly, the present invention aims at providing a wavelength-selective light-shielding element that prevents occurrence of interference when prevention of interference between information light and stray light is required and that enables enhancement of a utilization ratio of light when prevention of interference is not required, as well as providing an optical head using the element.

According to the present invention, there is provided a wavelength-selective light-shielding element, including:

a transparent substrate; and a light-shielding region that is provided in a portion of the transparent substrate; that permits passage of first circularly-polarized light rotating in a first direction regardless of a wavelength; that blocks a second circularly-polarized light beam whose wavelength falls within a predetermined range among the second circularly-polarized light beams rotating in a second direction opposite the first direction; and that permits passage of the second circularly-polarized light beams falling outside the predetermined range.

By means of the configuration, circularly-polarized light beams rotating in a specific direction among light beams whose wavelengths falling within a specific range are blocked.

There may also be adopted a configuration in which the light-shielding region is a reflection region that reflects the second circularly-polarized light beam whose wavelength falls within the predetermined range.

By means of the configuration, circularly-polarized light beams rotating in a specific direction among light beams whose wavelengths falling within a specific range are reflected.

The reflection region may also be cholesteric phase liquid crystal.

The reflection region may also be a region that reflects light beams included in a reflection wavelength region having a center frequency $\lambda_c = \{(n_o + n_e)/2\} \times P$ a wavelength bandwidth $\Delta\lambda = (n_e - n_o) \times P$ where $n_o$ = an ordinary refractive index of cholesteric phase liquid crystal $n_e$ = an extra ordinary refractive index of cholesteric phase liquid crystal P = a helical pitch of cholesteric phase liquid crystal.

The light-shielding region may also be configured so as to have a first diffraction area that diffracts the second circularly-polarized light beams whose wavelengths fall within the predetermined range.

By means of the configuration, circularly-polarized light beams rotating in a specific direction among light beams whose wavelengths falling within a specific range are diffracted.

The light-shielding region may also be configured so as to have a second diffraction area that diffracts, at a second angle which is smaller than the first angle, the second circularly-polarized light beams whose wavelengths falling outside the predetermined range.

The diffraction region may also be formed from a diffraction grating of cholesteric phase liquid crystal and an isotropic material filled into spaces in the diffraction grating.

The diffraction region may also have a configuration for diffracting light beams whose wavelengths are in proximity to a reflection wavelength region having a center frequency $\lambda_c = \{(n_o + n_e)/2\} \times P$ a wavelength bandwidth $\Delta\lambda = (n_e - n_o) \times P$ where $n_o$ = an ordinary refractive index of cholesteric phase liquid crystal $n_e$ = an extraordinary refractive index of cholesteric phase liquid crystal P = a helical pitch of cholesteric phase liquid crystal.

In the present specification, a wavelength achieved in proximity to the reflection wavelength region means a short-wavelength-edge reflection-wavelength-region-end wavelength ranging from $\lambda_c + \Delta\lambda$ to $\lambda_c + \Delta\lambda + 150$ nanometers or a long-wavelength-edge reflection-wavelength-region-end wavelength ranging from $\lambda_c - \Delta\lambda$ to $\lambda_c - \Delta\lambda - 150$ nanometers.

In order to yield a practically-effective effect, a wavelength achieved in proximity to the reflection wavelength region is preferably a short-wavelength-edge reflection-wavelength-region-end wavelength ranging from $\lambda_c + \Delta\lambda$ to $\lambda_c + \Delta\lambda + 100$ nanometers or a long-wavelength-edge reflection-wavelength-region-end wavelength ranging from $\lambda_c - \Delta\lambda$ to $\lambda_c - \Delta\lambda - 100$ nanometers.

There may also be a configuration in which a grid depth "d" of the diffraction grating is $[\lambda/\{2 \cdot \Delta n(\lambda)\}]$
where $\lambda$ = the wavelength of light to be blocked;

$\Delta n(\lambda) = |nP(\lambda) - nA(\lambda)|$ $nP(\lambda)$ = a refractive index of cholesteric phase liquid crystal for first circularly-polarized light $nA(\lambda)$ = a refractive index of cholesteric phase liquid crystal for second circularly-polarized light.

By means of the configuration, circularly-polarized light beams rotating in a specific direction among light beams whose wavelengths fall within a specific range are diffracted at a great angle.

The present invention provides a wavelength-selective light-shielding element having at least two of the wavelength-selective light-shielding elements in a laminated fashion.

By means of the configuration, circularly-polarized light beams rotating in a specific direction among light beams whose wavelengths fall within a plurality of specific ranges are blocked.

According to the present invention, there is provided an optical head including:

a light source;

a collimator lens that collimates light-source light emitted from the light source;

an objective lens for converging light to a recording layer of an optical disk;

a beam splitter that is positioned in an optical path for the light-source light between the light source and the collimator lens and that deflects and separates light reflected by the recording layer to an optical path differing from an optical path along which the light-source light reaches the recording layer;

a photodetector for detecting the deflected and separated reflected light; and the above-described wavelength-selective light-shielding element positioned in an optical path between the collimator lens and the objective lens.

There may also be adopted a configuration in which the light-source light emitted from the light source is linearly-polarized light; and the optical head further includes a phase modulation element that is positioned in an optical path between the beam splitter and the above-described wavelength-selective light-shielding element and that converts the light-source light into circularly-polarized light.

By means of the configuration, enhancement of the ratio of utilization of light is achieved in the case of reproduction of data from one recording layer, as well as occurrence of interference between information light and stray light, which would otherwise be caused when data are reproduced form a plurality of recording layers, is prevented.

As mentioned above, according to the present invention, there is provided a light-shielding region that permits passage of the first circularly-polarized light rotating in a first direction regardless of the wavelength of the first circularly-polarized light and that blocks, among second circularly-polarized light beams rotating in a second direction opposite the first direction, second circularly-polarized light beams whose wavelengths falling within a predetermined range, to thus permit passage of the second circularly-polarized light beams falling outside the predetermined range. As a result, there can be provided a wavelength-selective light-shielding element yielding an advantage of the ability to block light beams which rotate in a specific direction and whose wavelengths fall within a specific range as well as an optical head using the wavelength-selective light-shielding element.

BRIEF DESCRIPTION OF THE DRAWINGS

FIG. 6B is a cross-sectional view of a wavelength-selective light-shielding element of the third embodiment of the present invention.

BEST MODE FOR IMPLEMENTING THE INVENTION

By reference to the accompanying drawings, embodiments of the present invention will be described in detail hereunder. In the following descriptions, the direction of a helical twist of liquid crystal is assumed to be a clockwise direction.

Figure 1A:
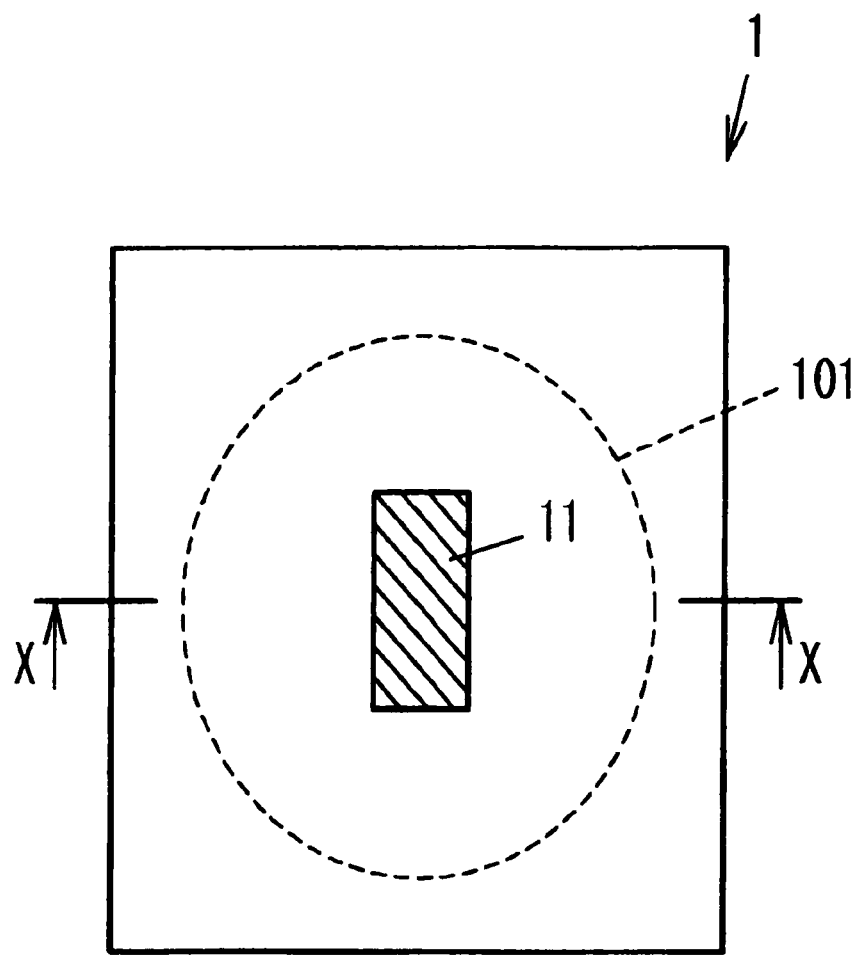
FIG. 1A is a top view of a wavelength-selective light-shielding element of a first embodiment of the present invention.
Figure 1B:
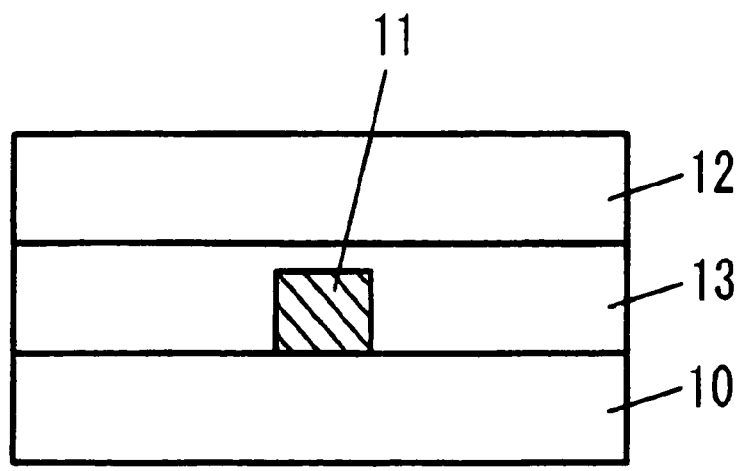
FIG. 1B is a cross-sectional view taken along line X-X in FIG. 1A.

As shown in FIGS. 1A and 1B, a wavelength-selective light-shielding element 1 of a first embodiment of the present invention has at least one light-shielding region 11 provided in a part of a transparent substrate 10 where light passes through an effective region 101. The light-shielding region 11 permits passage of first circularly-polarized light that rotates in a first direction (e.g., a counterclockwise direction) regardless of its wavelength; blocks second circularly-polarized light beams whose wavelength fall within a predetermined range of second circularly-polarized light that rotates in a second direction (e.g., a clockwise direction); and permits passage of second circularly-polarized light beams falling outside the predetermined range.

Specifically, the wavelength-selective light-shielding element 1 is built from two transparent substrates 10 and 12; cholesteric phase liquid crystal that is formed over the transparent substrate 10 and that functions as a light-shielding region 11; and a filler layer 13 in which the light-shielding region 11 is formed and that is filled into a gap between the transparent substrate 10 and the transparent substrate 12.

The transparent substrates 10 and 12 may also be used in combination with another optical element stacked on the wavelength-selective light-shielding element of the present invention. The essential requirement for the filler layer 13 is that the filler be optically isotropic and transparent for light of a wavelength that is an object of the wavelength-selective light-shielding element of the present invention. For instance, an acrylic polymer resin can be applied to the filler layer.

Cholesteric liquid crystal or nematic liquid crystal doped with a chiral material can be used as the cholesteric phase liquid crystal. Solidifying liquid crystal results in no necessity for a seal structure that prevents leakage of liquid crystal, as well as enabling a reduction in temperature dependence. Hence, it is preferable to use polymer cholesteric liquid crystal produced by polymerization and solidification of a polymeric liquid crystal composition.

Polymer cholesteric liquid crystal is produced by polymerization and solidification of a polymeric liquid crystal composition including nematic liquid crystal and a chiral agent, at least either of which exhibits a polymeric characteristic, by means of exposure to UV radiation, heating, and the like.

Cholesteric phase liquid crystal has a helical twist. When a helical pitch P is substantially equivalent to a wavelength λ of incident light, the cholesteric phase liquid crystal reflects circularly-polarized light that enters in the direction of a helical axis and that rotates in the same direction as the direction of a helical twist; and permits passage of circular-polarized light that rotates in an opposite direction. A center wavelength λc and a band width Δλ of the circularly-polarized light to be reflected are given by [Mathematical Expression 1].

$$\lambda c = \frac{(n_o + n_e)}{2} \times P \qquad \text{[Mathematical Expression 1]}$$

$$\Delta\lambda = (n_e - n_o) \times P$$

where $n_o$=a refractive index of liquid crystal for ordinary light, $n_e$=a refractive index of liquid crystal for extraordinary light, and P=a helical pitch of liquid crystal.

Specifically, the cholesteric phase liquid crystal exhibits the following characteristics in relation to circular-polarized light that rotates in the same direction as the direction of a helical twist of liquid crystal and that has a wavelength λ.

Circularly-polarized light in a reflection wavelength band of λc−Δλ/2<λ<λc+Δλ/2 is reflected.

Circularly-polarized light outside a reflection wavelength band of λ≦λc−Δλ/2 or λc+Δλ/2≦λ is passed.

In relation to circularly-polarized light that rotates in a direction opposite the direction of a helical twist of liquid crystal, the cholesteric phase liquid crystal acts as an isotropic medium exhibiting transmittance without regard to the wavelength of incident light. The refractive index of cholesteric phase liquid crystal is substantially equal to an average of a refractive index of liquid crystal for ordinary light and a refractive index of liquid crystal for extraordinary light.

Since a material exhibiting, in relation to circularly-polarized light having wavelengths $\lambda_1$ and $\lambda_2$, a refractive index substantially equal to an average refractive index prevents occurrence of an optical phase step, which would otherwise deteriorate a focusing characteristic, using the material as a filler to be filled into the circumference of the light-shielding section is preferable.

A method for manufacturing the wavelength-selective light-shielding element 1 will now be described.

1) A polyimide film is applied over respective single surfaces of two transparent substrates, and the films are sintered. The substrates are subjected to orientation processing, such as rubbing, thereby producing alignment films.

2) The two transparent substrates are spaced apart and opposite each other at 6.2 micrometers of space with the alignment films facing inside, and a polymeric liquid crystal composition is filled into the space.

3) The polymer liquid crystal composition is polymerized and solidified upon exposure to UV radiation, thereby producing polymer cholesteric phase liquid crystal.

For instance, polymeric nematic liquid crystal that exhibits an ordinary refractive index of $n_o=1.56$ and an extraordinary refractive index of $n_e=1.68$ is doped with an amount of a clockwise polymer chiral agent at which a helical pitch P of 0.405 micrometers is attained. The liquid crystal composition is polymerized and solidified, whereby there can be acquired a polymer cholesteric liquid crystal layer that reflects clockwise circularly-polarized light whose wavelength falls in a range where a center frequency $\lambda c=663$ nanometers and a bandwidth $\Delta\lambda=49$ nanometers are achieved.

4) Only one of the two transparent substrates is removed, and the polymer cholesteric liquid crystal layer is removed from an area other than the light-shielding region 11 by means of photolithography and etching, whereby the light-shielding region 11 is produced on the transparent substrate 10.

5) The other transparent substrate 12 is positioned on the light-shielding region 11 of the transparent substrate 10 at 10 micrometer of a space; an isotropic resin exhibiting a refractive index of; for instance, 1.62, is filled into the space; and it is cured.

When the wavelength-selective light-shielding element 1 is stacked along with another optical element, the transparent substrate 10 and the transparent substrate 12 may also share the other optical element.

Figure 2:
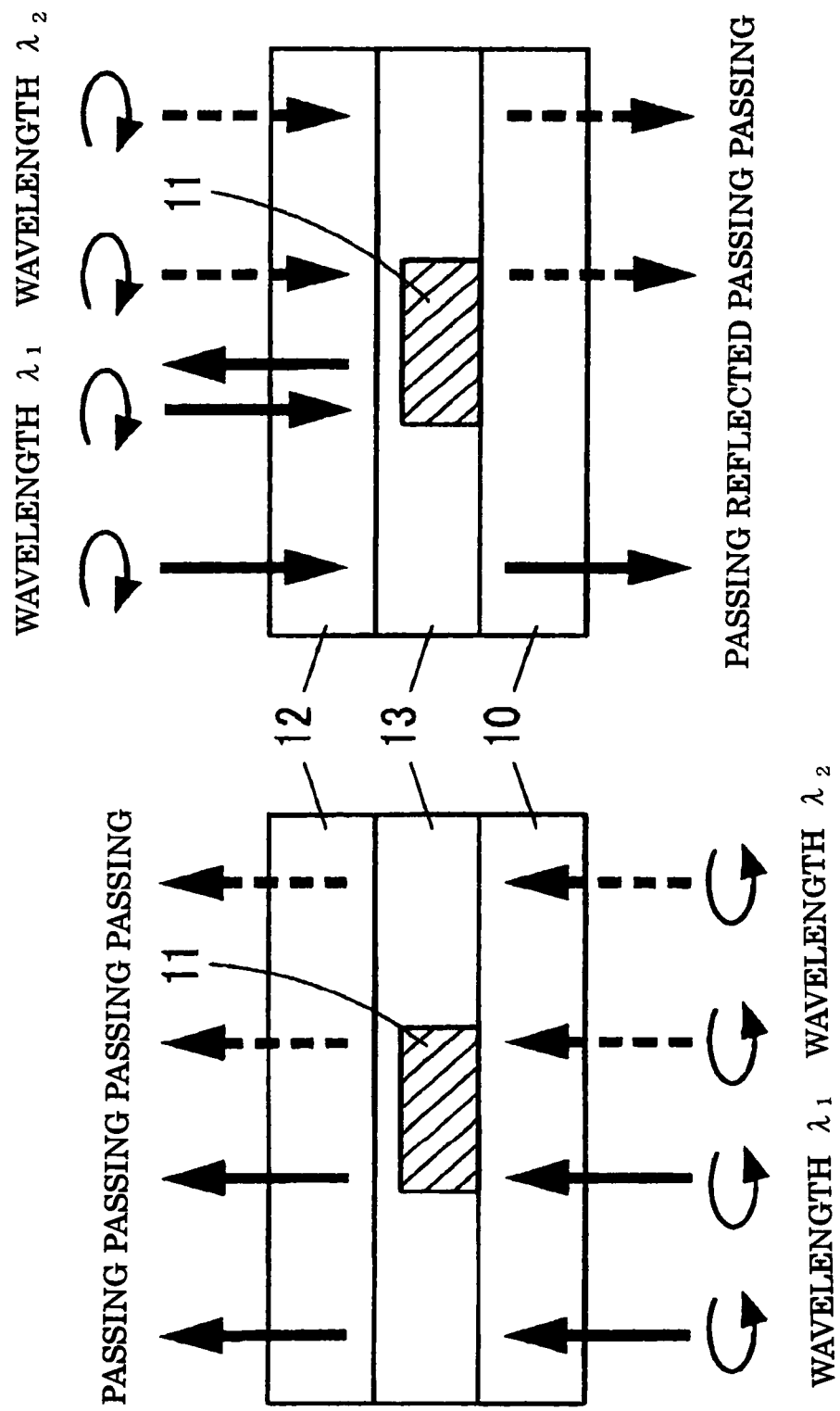
FIG. 2 is a cross-sectional view showing operation of a first embodiment of the wavelength-selective light-shielding element of the present invention.

As shown in FIG. 2, the wavelength-selective light-shielding element 1 manufactured through the above processes reflects only clockwise circularly-polarized light of light having a wavelength $\lambda_1=660$ nanometers applied for recording and reproduction of a DVD and permits passage of counterclockwise circularly-polarized light and linearly-polarized light. Further, the wavelength-selective light-shielding element permits passage of light having a wavelength $\lambda_1=785$ nanometers applied to recording and reproduction of a CD without regard to a polarized state of the light.

Wavelength selectivity is exhibited, so long as the thickness of a polymeric cholesteric liquid crystal layer is set to a value that is about five times as large as the helical pitch. In fact, a value that is ten times as large as the helical pitch or greater is required. In order to achieve greater reflectance, a value that is twenty times as large as the helical pitch or greater is desirable.

However, when the thickness of the polymer cholesteric liquid crystal layer exceeds 50 micrometers, domains will arise in the liquid crystal layer, which may disturb an orientation. Hence, it is required to adjust the thickness of the liquid crystal layer so as to be 50 micrometers or less. A polymer cholesteric liquid crystal layer having a thickness of 30 micrometers or less, which is easy to manufacture, is desirable.

As mentioned above, the wavelength-selective light-shielding element 1 of the above configuration reflects a circularly-polarized light beam rotating in the same direction as that of a helical pitch of cholesteric phase liquid crystal, among circularly-polarized light beams whose wavelengths are determined by an ordinary refractive index, an extraordinary refractive index, and a helical pitch of cholesteric phase liquid crystal forming the light-shielding section, thereby permitting passage of a circularly-polarized light beam that rotates in an opposite direction. In the following descriptions, light-source light is explained as light traveling along an optical path from the light source to a recording layer of an optical disk, and reflected light is explained as light traveling along an optical path from the recording layer of the optical disk to the photodetector.

Figure 3:
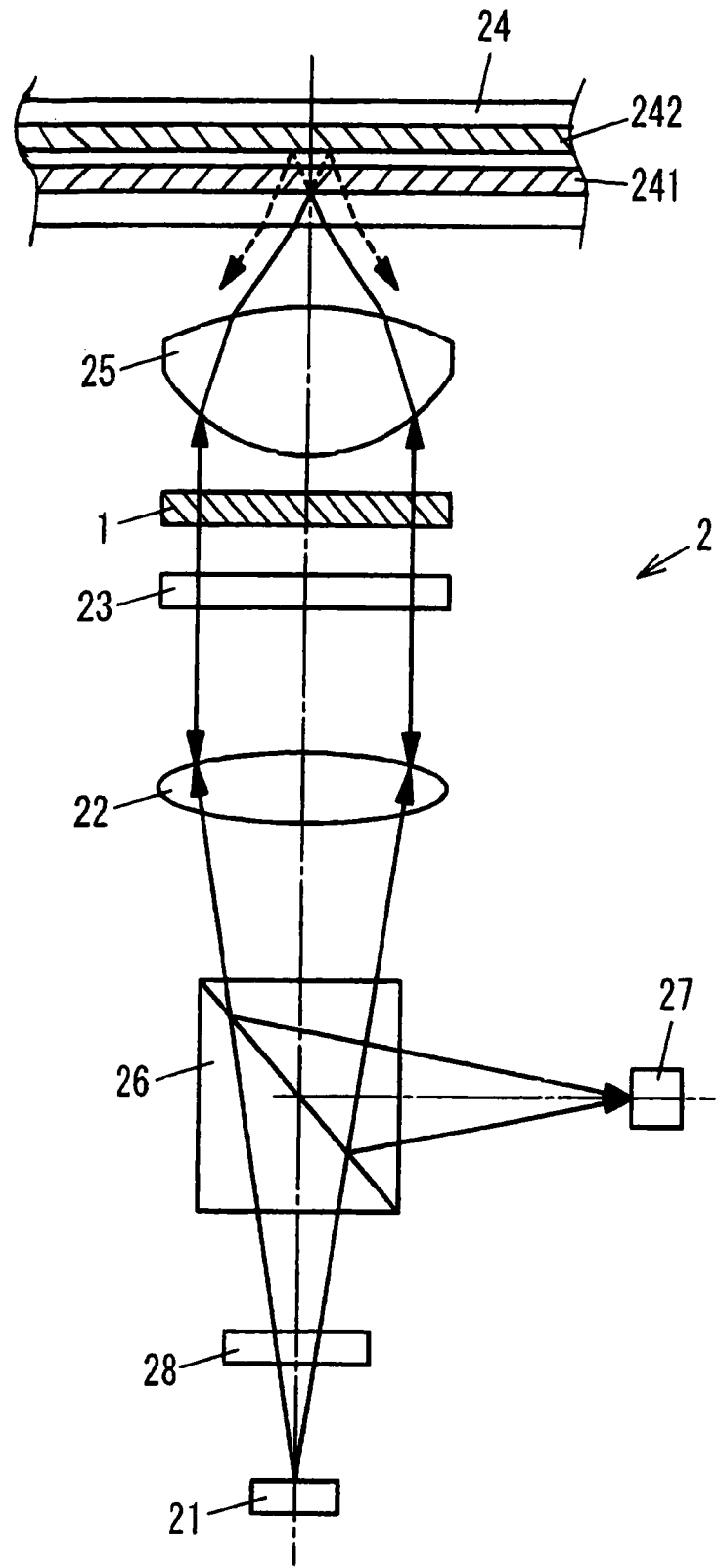
FIG. 3 is a schematic diagram showing an optical head using the wavelength-selective light-shielding element in FIG. 1A.

As shown in FIG. 3, the optical head 2 using the wavelength-selective light-shielding element 1 includes a light source 21 that emits linearly-polarized light-source light having a wavelength $\lambda_1=660$ nanometers for reproducing data in a DVD and linearly-polarized light-source light having a wavelength $\lambda_2=785$ nanometers applied for recording and reproducing data in and from a CD; a collimator lens 22 for converting the light-source light into collimated linearly-polarized light; a quarter wavelength plate 23 that converts the linearly-polarized light-source light into first circularly-polarized light that rotates in a first direction; an objective lens 25 that converges light to a first recording layer 241 of two first and second recording layers 241, 242 of the optical disk 24 and that collimates the reflected light which turned into second circularly-polarized light rotating in a second direction opposite to the first direction as a result of having undergone reflection on the first and second recording layers 241 and 242; the wavelength-selective light-shielding element 1 interposed between the quarter wavelength plate 23 and the objective lens 25; a beam splitter 26 that is interposed between the light source 21 and the collimator lens 22 and that separates the light-source light from the reflected light converted into the linearly-polarized light by the quarter wavelength plate 23; and a photodetector 27 that converts the intensity of the reflected light separated by the beam splitter 26 into an electrical signal. The wavelength-selective light-shielding element 1 of the first embodiment has the light-shielding region 11 that reflects the clockwise circularly-polarized light in a 650-nanometer band. A diffraction element 28 is an optical element that separates linearly-polarized light emitted from the light source 21 into one main beam and two sub-beams.

The linearly-polarized light-source light that is emitted from the light source 21 and that has a wavelength $\lambda_1=660$ nanometers is separated into a main beam and two sub-beams by the diffraction element 28, and the thus-separated beams pass through the beam splitter 26 and are collimated by the collimator lens 22.

The collimated light-source light is converted into circularly-polarized light that rotates in a counterclockwise direction by the quarter wavelength plate 23, and the thus-converted circularly-polarized light enters the wavelength-selective light-shielding element 1. However, since the direction of rotation of the light is a counterclockwise direction, the light passes through the wavelength-selective light-shielding element 1.

At the time of reproduction of data in the first recording layer 241, the objective lens 25 converges the light-source light passed through the wavelength-selective light-shielding element 1 to the first recording layer 241 serving also as a reproduction layer, whilst the circularly-polarized light reaches also the second recording layer 242 serving a non-reproduction layer.

The circularly-polarized light that has been reflected by the first recording layer 241 and the second recording layer 242 and that rotates in a counterclockwise direction turns into circularly-polarized reflected light of a wavelength $\lambda_1$ rotating in a clockwise direction, and the reflected light is collimated by the objective lens 25.

The thus-collimated reflected light enters the wavelength-selective light-shielding element 1 of the first embodiment. However, since the direction of rotation of the reflected light is a clockwise direction, the reflected light undergoes reflection in the light-shielding region 11, to thus pass through an area other than the light-shielding region 11.

The reflected light is separated from the light-source light by the beam splitter 26, to thus reach the photodetector 27. Of non-information light beams that are light reflected by the second recording layer 242, non-information light beams passed through the area of the wavelength-selective light-shielding element 1 other than the light-shielding region 11 do not converge to the surface of the photodetector. Therefore, as in an area 275 shown in FIG. 4, the non-information light beams diffuse into the outside of the photodetector 27 covered with the light-shielding region 11 of the wavelength-selective light-shielding element 1. The non-information light entered the light-shielding region 11 of the wavelength-selective light-shielding element 1 undergoes reflection in the light-shielding region 11, to thus fail to reach the photodetector 27.

Figure 4:
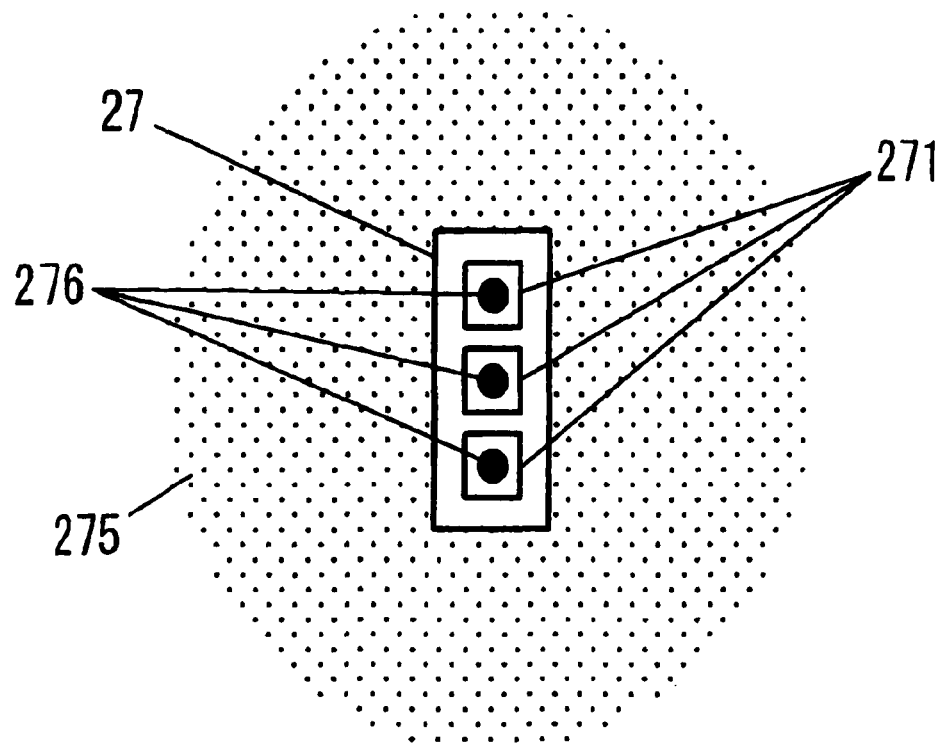
FIG. 4 is a top view of a photodetector of the optical head in FIG. 3.

In contrast, among the information light beams that are light reflected by the first information layer 241 serving as a reproduction layer, the information light beams passed through the area of the wavelength-selective light-shielding element 1 other than the light-shielding region 11 converge to three cells 271 included in the photodetector 27 as indicated by solid circles 276 shown in FIG. 4. The information light beam entered the light-shielding region 11 of the wavelength-selective light-shielding element 1 also undergoes reflection in the light-shielding region 11, to thus fail to reach the photodetector 27.

Accordingly, only the information light beams reflected by the first recording layer 241 enter the respective three cells 271, and the non-information light reflected by the second recording layer 242 does not enter the cells. Therefore, interference does not arise between the information light and the non-information light, and the accuracy of reproduction can be assured.

The foregoing descriptions are provided for the case where the first recording layer 241 is a reproduction layer and where the second recording layer 242 is a non-reproduction layer. In a case where the first recording layer 241 is taken as a non-reproduction layer and where the second recording layer 242 is taken as a reproduction layer, the objective lens 25 is moved and adjusted such that the light-source light comes into a focus on the second recording layer 242.

The linearly-polarized light-source light that is emitted from the light source 21 and that has a wavelength $\lambda_2$=785 nanometers travels through the optical path of the optical head 2 as does the linearly-polarized light-source light having the wavelength $\lambda_1$ (a 650-nanometer band for use with a DVD), to thus enter the wavelength-selective light-shielding element 1. However, the wavelength-selective light-shielding element 1 does not act on light having a wavelength $\lambda_1$=785 nanometers; hence, the light passes without being blocked by the wavelength-selective light-shielding element 1. The light-source light of a wavelength $\lambda_1$=785 nanometers that has passed through the wavelength-selective light-shielding element 1 and that has been converged and radiated onto a recording layer of an unillustrated optical disk formed from a single layer by the objective lens 25 is reflected by the recording layer, to thus turn into reflected light. The reflected light travels through the optical path in an opposite direction and again enters the wavelength-selective light-shielding element 1. However, as in the case of the light-source light, the thus-entered light pass through the wavelength-selective light-shielding element 1 without being blocked, to thus reach the photodetector 27.

As described above, the optical head 2 having the above configuration can prevent interference of information light with stray light when an optical disk that uses the light-source light of the wavelength $\lambda_1$ and that has a plurality of recording layers is subjected to reproduction. Further, when an optical disk using light-source light whose wavelength $\lambda_2$ differs from the wavelength $\lambda_1$ is subjected to reproduction, the light-source light can be effectively utilized.

In the present embodiment, the light source 21 is described as emitting the linearly-polarized light having the wavelength $\lambda_1$ (a 650-nanometer band for a DVD) and the linearly-polarized light having a wavelength $\lambda_1$=785 nanometers applied for recording and reproducing data in and from a CD. However, the light source may also act as a light source that emits the linearly-polarized light having the wavelength $\lambda_1$ (a 650-nanometer band for a DVD) and linearly-polarized light having a wavelength $\lambda_3$ (e.g., a 400-nanometer band for a high-density optical disk). Alternatively, the light source may also act as a light source that emits the linearly-polarized light having the wavelength $\lambda_1$ (a 650-nanometer band for a DVD) and a wavelength $\lambda_3$ (e.g., a 400-nanometer band for a high-density optical disk). Further, the light source may also act as a light source that emits linearly-polarized light having three wavelengths; namely, a wavelength $\lambda_3$ (e.g., a 400-nanometer band for a high-density optical disk), the wavelength $\lambda_1$ (a 650-nanometer band for a DVD), and the wavelength $\lambda_1$ (a 650-nanometer band for a DVD).

The 650-nanometer band signifies a band ranging from 630 nanometers to 670 nanometers; the 780-nanometer band signifies a band ranging from 760 nanometers to 800 nanometers; and the 400-nanometer band signifies a band ranging from 385 nanometers to 430 nanometers.

The light source 21 is described as emitting linearly-polarized light. However, the quarter wavelength plate 23 does not necessarily provided, so long as the light source emits circularly-polarized light. Moreover, the quarter wavelength plate 23 is positioned to convert linearly-polarized light into circularly-polarized light. However, the essential requirement is to place a wavelength plate that converts ovally-polarized light into circularly-polarized light, so long as the light-source light is ovally-polarized light. An element for converging linearly-polarized light and ovally-polarized light into circularly-polarized light is taken as a phase modulation element and assumed to include the quarter wavelength plate. Further, the phase modulation element may also be a wideband wavelength plate with a multilayer of birefringent medium in place of quarter wavelength plate 23. In this case, the light-shielding characteristic of the wavelength-selective light-shielding element 1 can be enhanced. Moreover, a reduction in the number of components and simplification of assembly can be realized by assembling the wavelength-selective light-shielding element 1 and the broadband wavelength plate into a piece, as well as destabilization of the light source, which would otherwise be caused by return light, can be prevented.

the collimator lens 22 is positioned in the optical path for the light-source light between the light source 21 and the beam splitter 26. The same function can be fulfilled even when an unillustrated condensing lens is positioned in the optical path for the reflected light between the beam splitter 26 and the photodetector 27. However, the layout results in an increase in the number of components, and the layout shown in FIG. 3 is preferable.

A second embodiment of the present invention will now be described.

Figure 5A:
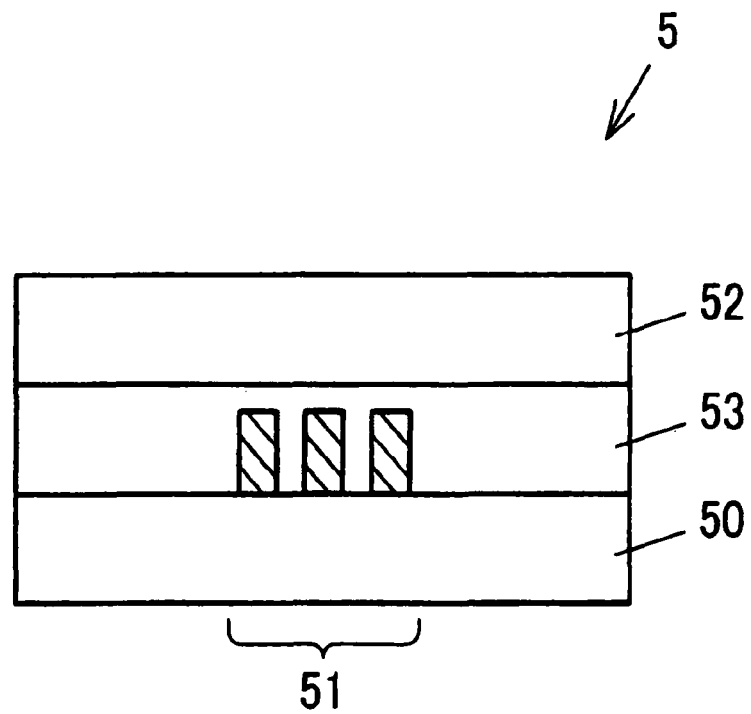
FIG. 5A is a cross-sectional view of a wavelength-selective light-shielding element of a second embodiment of the present invention.

As shown in FIG. 5A, the wavelength-selective light-shielding element 5 of the present embodiment uses, as a light-shielding region 51, a wavelength-selective diffraction grating made of cholesteric phase liquid crystal. Since the characteristic of transmission diffraction of the cholesteric phase liquid crystal is used in the present embodiment, the wavelength λ of light handled by the wavelength-selective light-shielding element 5 of the second embodiment preferably falls outside a reflection wavelength band that is equal to or less than λc−Δλ/2 or equal to or greater than λc+Δλ/2.

In relation to light whose wavelength is in close vicinity to the reflection wavelength band, the wavelength-selective diffraction grating made of cholesteric phase liquid crystal undergoes an increase in difference between a refractive index of circularly-polarized light that rotates in the same direction as the direction of rotation of the cholesteric phase liquid crystal and a refractive index of circularly-polarized light that rotates in a direction opposite to the direction of rotation of the cholesteric phase liquid crystal.

In the meantime, in relation to light whose wavelength is apart from the reflection wavelength band, the refractive index of circularly-polarized light that rotates in the same direction as the direction of rotation of the cholesteric phase liquid crystal substantially coincides with the refractive index of circularly-polarized light that rotates in the direction opposite to the direction of rotation of the cholesteric phase liquid crystal.

Provided that a refractive index of circularly-polarized light of wavelength λ that rotates in the same direction as the direction of rotation of liquid crystal molecules of the cholesteric phase liquid crystal is taken as nP(λ); a refractive index of circularly-polarized light of wavelength λ that rotates in the direction opposite to the direction of rotation of liquid crystal molecules is taken as nA(λ); and a difference (a difference between the refractive indices) is taken as Δn(λ), Δn(λ) is expressed by [Mathematical Expression 2].

$$\Delta n(\lambda) = |nP(\lambda) - nA(\lambda)|$$ [Mathematical Expression 2]

Provided that a wavelength achieved in the vicinity of the reflection wavelength band is taken as $\lambda_1$ and a wavelength achieved apart from the reflection wavelength band is taken as $\lambda_2$, $\Delta n(\lambda_2)$ essentially comes to a value of zero, and $\Delta n(\lambda_1)$ comes to a large value. Specifically, [Mathematical Expression 3] stands.

$$\Delta n(\lambda_2) \approx 0$$

$$\Delta n(\lambda_1) = |nP(\lambda_1) - nA(\lambda_1)| > \Delta n(\lambda_2)$$ [Mathematical Expression 3]

In order to enhance a light-shielding characteristic, it is desirable that a product of the depth "d" of a diffraction grating and the difference $\Delta n(\lambda_1)$ between the refractive indices satisfy [Mathematical Expression 4].

$$\Delta n(\lambda_1) \cdot d = \frac{\lambda_2}{z} + m\lambda_1$$ [Mathematical Expression 4]

where m=0, 1, 2, 3, . . . .

In particular, a diffraction grating which exhibits superior wavelength dependence and incident angle dependence, which is easy to create gratings, and which satisfies [Mathematical Expression 5] is most preferable, because an angle of rotation achieved with reference to light having the wavelength $\lambda_1$ comes to 90 degrees.

$$\Delta n(\lambda_1) \cdot d = \frac{\lambda_2}{2}$$ [Mathematical Expression 5]

In relation to circularly-polarized light that rotates in a direction opposite to the direction of a helical twist of liquid crystal, the cholesteric phase liquid crystal functions as an isotropic medium exhibiting transparence regardless of the wavelength of incident light. A refractive index of the cholesteric phase liquid crystal is substantially equal to an average of a refractive index of liquid crystal for ordinary light and a refractive index of liquid crystal for extraordinary light.

Accordingly, it is preferable to use, as a filler to be filled to the circumference of the light-shielding section, a material exhibiting a refractive index substantially equal to an average refractive index in response to circularly-polarized light having wavelengths $\lambda_1$ and $\lambda_2$ in terms of prevention of a loss in diffraction and an increase in optical rotary dispersion.

A method for manufacturing the wavelength-selective light-shielding element 5 will now be described.

1) A polyimide film is applied over respective single surfaces of two transparent substrates, and the films are sintered. The substrates are subjected to orientation processing, such as rubbing, thereby producing alignment films.

2) The two transparent substrates are spaced apart and opposite in parallel to each other at 10.0 micrometers of space with the alignment films facing inside, and cholesteric liquid crystal or cholesteric phase liquid crystal that is nematic liquid crystal doped with a chiral agent is filled into the space.

For instance, nematic liquid crystal that exhibits an ordinary refractive index $n_o$ of 1.56 and an extraordinary refractive index $n_e$ of 1.78 is doped with a chiral agent, and cholesteric phase liquid crystal having a clockwise helical pitch P of 0.35 micrometers is filled.

3) The cholesteric phase liquid crystal is solidified upon exposure to UV radiation so as to have a thickness of 10.0 micrometers. Of the two transparent substrates, one substrate is removed, whereupon the solidified cholesteric phase liquid crystal is exposed on the transparent substrate 50.

4) The cholesteric phase liquid crystal is eliminated from an area other than a grid having a grid pitch of 5 micrometers in the light-shielding region 51, by means of photolithography and etching, thereby generating a grid area.

5) The transparent substrate 52 is positioned on the grid area of the transparent substrate 50, and a space between the substrates 50 and 52 is filled with a filler layer 53 that is; for instance, an isotropic resin having a refractive index of 1.67.

According to the manufacturing method, the wavelength-selective light-shielding element 5 of the second embodiment diffracts light having a center wavelength $\lambda_c$=585 nanometers and a wavelength band Δλ=77 nanometers.

Figure 5B:
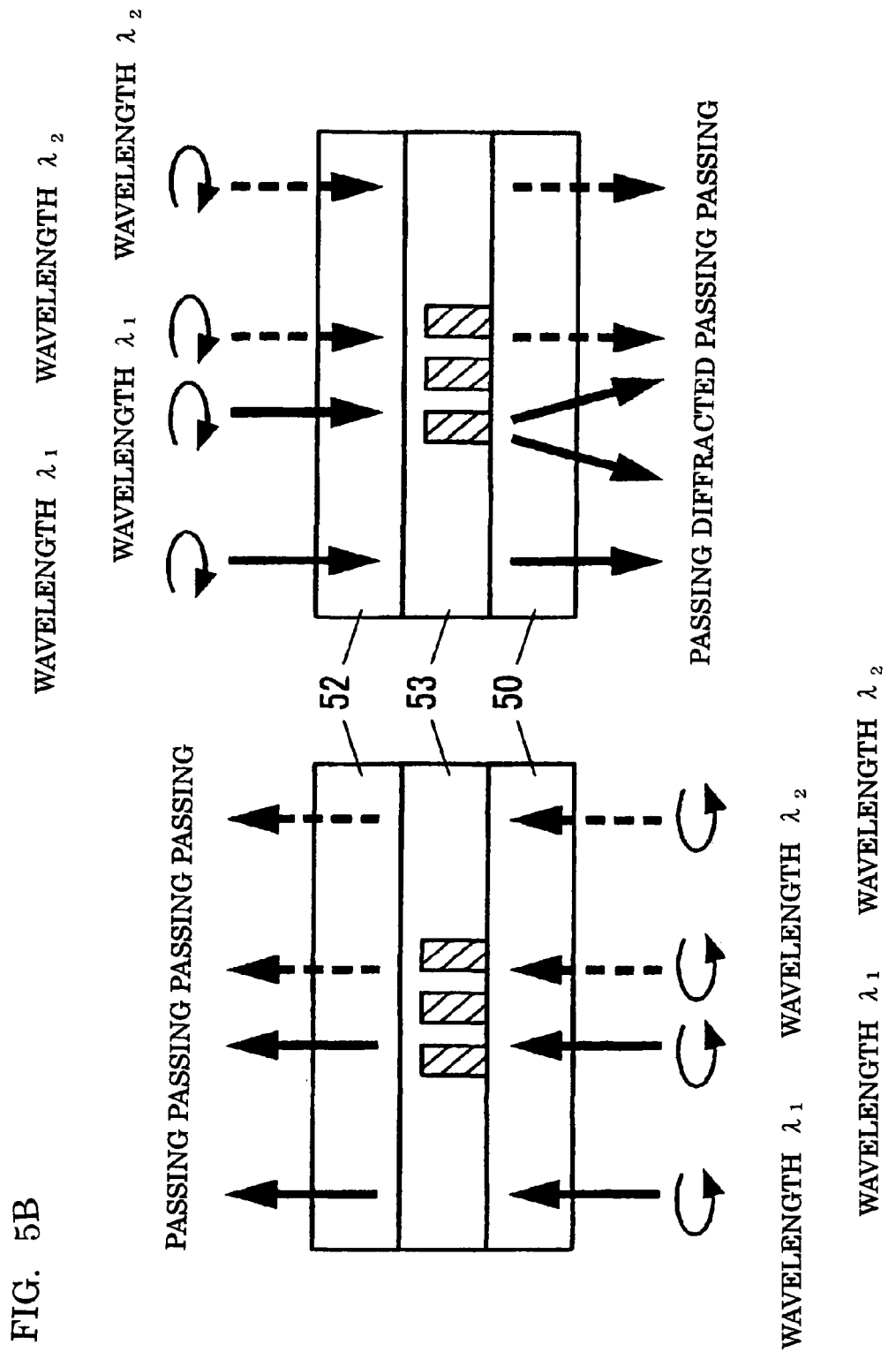
FIG. 5B is a cross-sectional view of a wavelength-selective light-shielding element of the second embodiment of the present invention.

As shown in FIG. 5B, the light-shielding region 51 diffracts at a large angle a clockwise circularly-polarized light beam among light beams having a wavelength $\lambda_1$=660 nanometers used for recording and reproducing data in and from a DVD, but hardly diffracts counterclockwise circularly-polarized light and linearly-polarized light.

As shown in FIG. 5B, the light-shielding region 51 of the wavelength-selective light-shielding element 5 hardly diffracts, without regard to a polarized state, a light beam having a wavelength $\lambda_2$=785 nanometers used for recording and reproducing data in and from a CD.

As described above, the wavelength-selective light-shielding element of the above configuration enables selective diffraction of a circularly-polarized light beam rotating in the same direction as that of the helical pitch of the cholesteric phase liquid crystal, among circularly-polarized light beams whose wavelengths are determined from an ordinary refractive index, an extraordinary refractive index, and a helical pitch of cholesteric phase liquid crystal forming a light-shielding area.

When the wavelength-selective light-shielding element 5 is applied, in lieu of the wavelength-selective light-shielding element 1, to the optical head 2, directions of propagation of blocked light deviate from the principal ray path, and hence influence on the principal ray path attributable to multiple reflections can be diminished.

A third embodiment of the present invention will now be described.

Figure 6A:
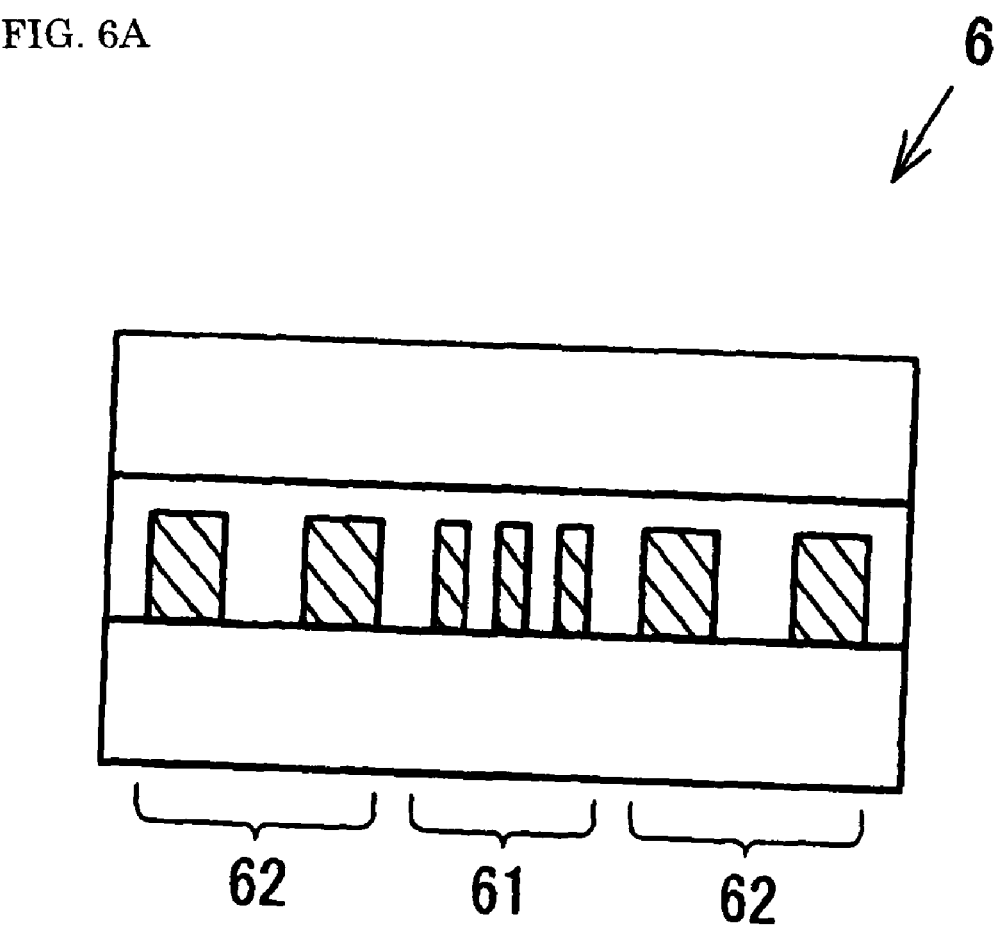
FIG. 6A is a cross-sectional view of a wavelength-selective light-shielding element of a third embodiment of the present invention.

As shown in FIG. 6A, a wavelength-selective light-shielding element 6 of a present embodiment is identical with its counterpart described in connection with the second embodiment in that a first wavelength-selective diffraction grating 61 produced from cholesteric phase liquid crystal is used as a light-shielding area; however, the present embodiment differs from the second embodiment in that a second wavelength-selective diffraction grating 62 whose grid pitch is wider than that of the first wavelength-selective diffraction grating 61 is formed outside the first wavelength-selective diffraction grating 61.

As shown in FIG. 6B, the wavelength-selective light-shielding element 6 permits passage of counterclockwise circularly-polarized light but diffracts clockwise circularly-polarized light at a large angle by means of the first wavelength-selective diffraction grating 61 and at a small angle by means of the second wavelength-selective diffraction grating 62. The word "angle" used herein means an angle that the travel direction of light forms with the direction of diffraction.

So long as the photodetector 27 is positioned at a location where reflected light diffracted at a small angle by the second wavelength-selective diffraction grating 62 can be received, the first wavelength-selective diffraction grating 61 whose angle of diffraction is sufficiently large to such an extent that diffracted light does not enter or converge to the photodetector 27 acts as a light-shielding area for reflected light.

When the wavelength-selective light-shielding element 6 is applied, in lieu of the wavelength-selective light-shielding element 1, to the optical head 2, an element having in combination the light-shielding function and a polarizing hologram function for detecting a signal can be realized.

A fourth embodiment of the present invention will now be described.

Figure 7:
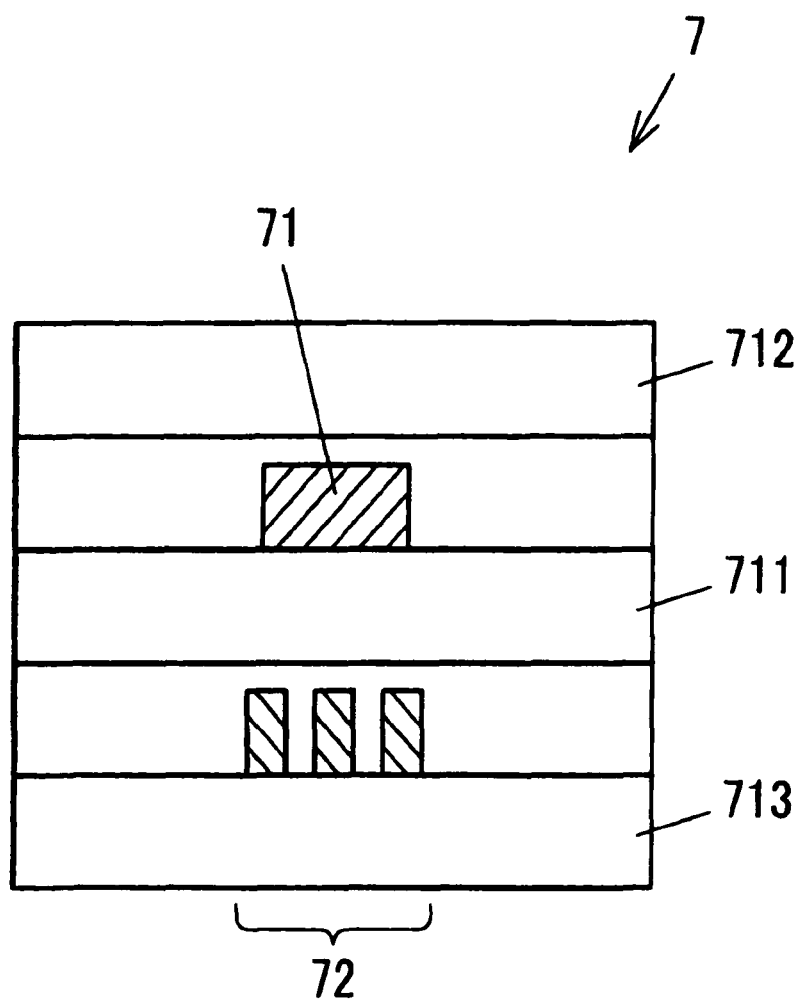
FIG. 7 is a cross-sectional view of a wavelength-selective light-shielding element of a fourth embodiment of the present invention.
Figure 8A:
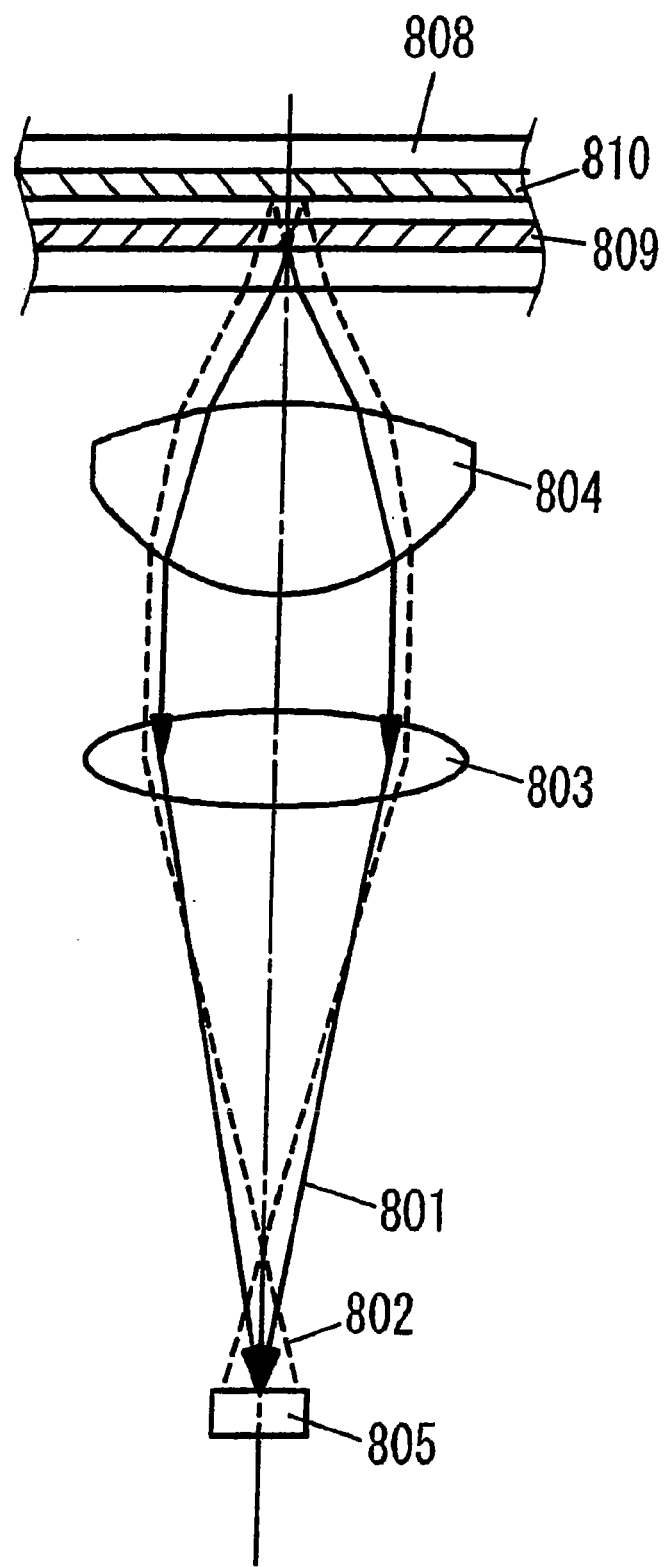
FIG. 8A is a schematic view showing a related-art optical head.
Figure 8B:
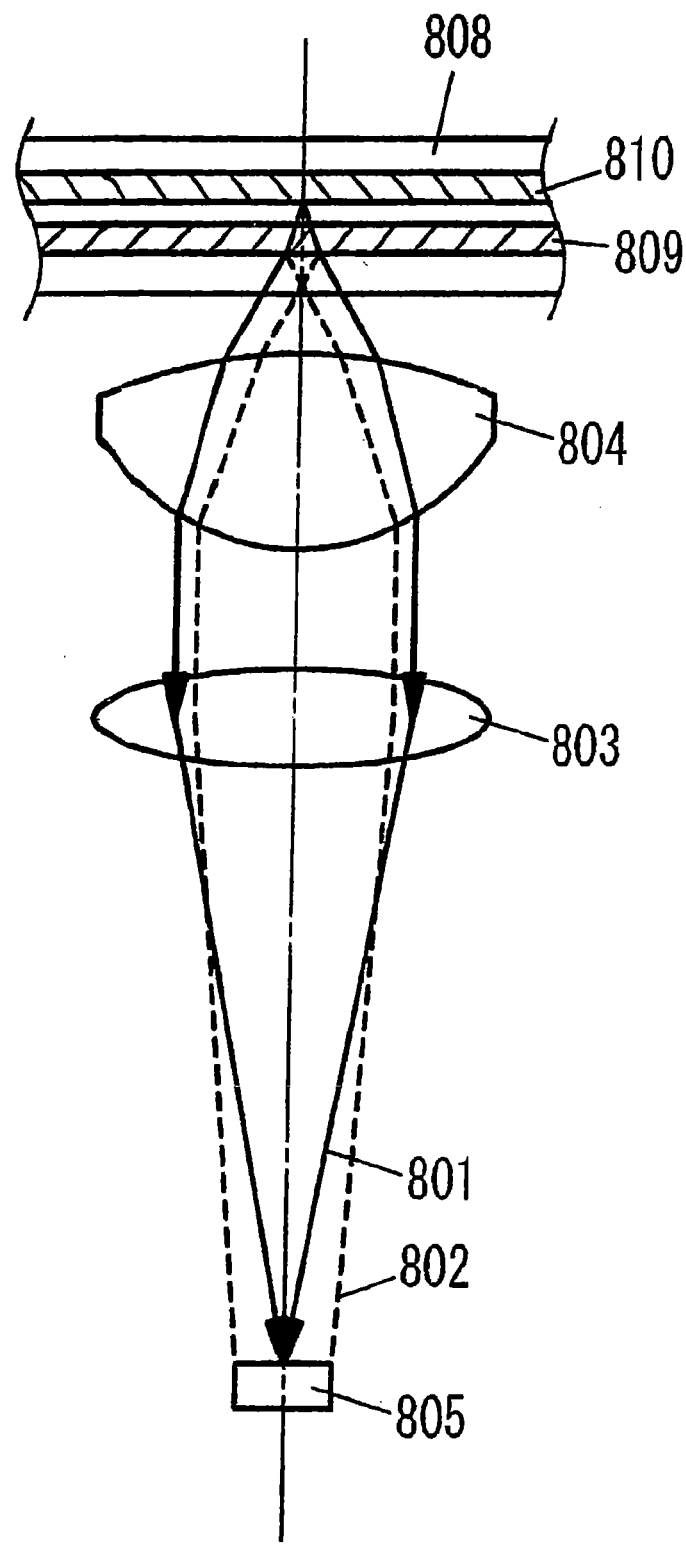
FIG. 8B is a schematic view showing the related-art optical head.
Figure 9A:
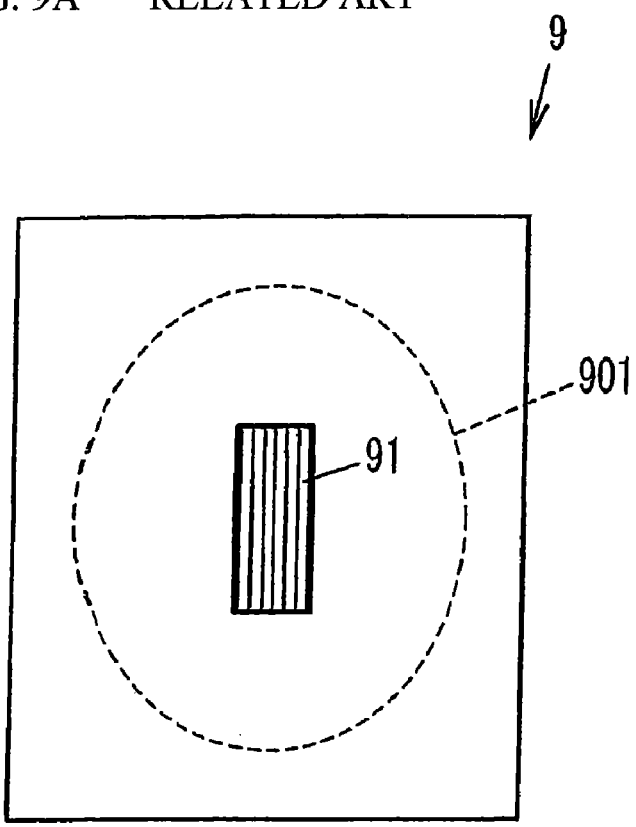
FIG. 9A is a top view of a related-art optical member.
Figure 9B:
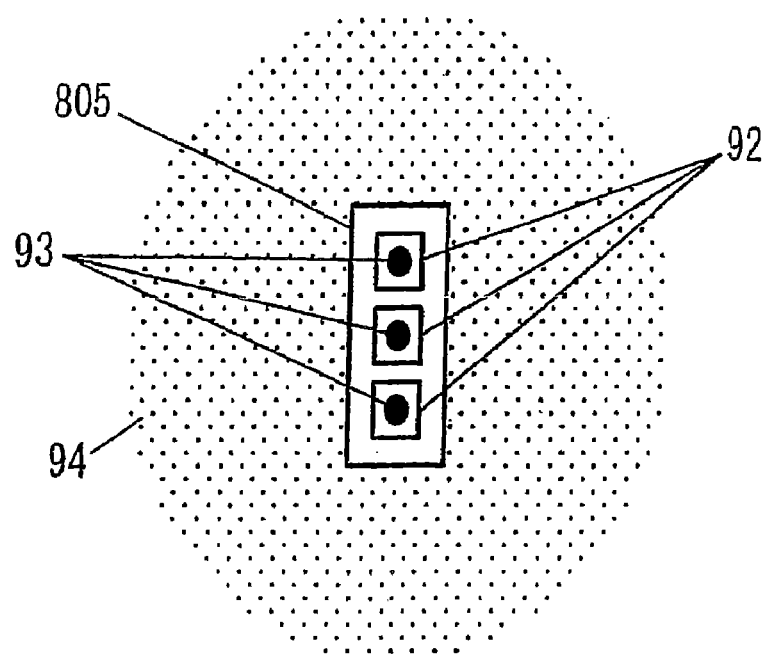
FIG. 9B is a top view of a photodetector in the related-art optical head.

As shown in FIG. 7, a wavelength-selective light-shielding element 7 of the present embodiment has a multilayer structure including a center first glass substrate 711 shared between the wavelength-selective light-shielding element 1 of the first embodiment and the wavelength-selective light-shielding element 5 of the second embodiment.

Specifically, a reflection-type light-shielding area 71 sandwiched between a first glass substrate 711 and a second glass substrate 712 reflects clockwise circularly-polarized light having a center wavelength $\lambda_c$=663 nanometers and a bandwidth $\Delta\lambda$=49 nanometers as does the light-shielding region 11 of the wavelength-selective light-shielding element 1 of the first embodiment, and permits passage of the other light beams.

A diffraction-type light-shielding region 72 sandwiched between the first glass substrate 711 and the third glass substrate 713 has the same configuration as that of the light-shielding region 51 of the wavelength-selective light-shielding element 5 of the second embodiment. However, the diffraction grating is formed from cholesteric phase liquid crystal having an ordinary refractive index of 1.55, an extraordinary refractive index of 1.71, a clockwise helical pitch of 0.285 micrometers, and a thickness of 15 micrometers.

As a consequence, the second light-shielding region 72 reflects light of reflection wavelength band having a center wavelength $\lambda_c$=465 nanometers and a bandwidth $\Delta\lambda$=35 nanometers. In relation to light that has a wavelength of 405 nanometers and that is a wavelength located in proximity to a short wavelength side of the reflection wavelength band, the second light-shielding region comes to have an angle of rotation of about 90 degrees and exhibits a different refractive index according to the direction of rotation of circularly-polarized light.

In relation to light beams having wavelengths of 660 nanometers and 785 nanometers sufficiently spaced apart from the reflection wavelength band, the second light-shielding region 72 assumes an angle of rotation of about zero and has a substantially-constant refractive index regardless of the direction of rotation of the circularly-polarized light.

Accordingly, the wavelength-selective light-shielding element 7 of the fourth embodiment permits passage of counterclockwise circularly-polarized light having a wavelength of 405 nanometers for a high-density DVD, light having a wavelength of 660 nanometers for a DVD, and light having a wavelength of 785 nanometers for a CD.

In contrast, the clockwise circularly-polarized light having a wavelength of 405 nanometers for a high-density DVD undergoes great diffraction in the second light-shielding region 72 and hence does not enter the photodetector 27. The clockwise circularly-polarized light having a wavelength of 660 nanometers for a DVD is reflected by the first light-shielding region 71 and hence does not enter the photodetector 27. The clockwise circularly-polarized light having a wavelength of 785 nanometers for a CD passes through the first light-shielding region 71 and the second light-shielding region 72, and hence light having a high density achieved in proximity to the optical axis is not lost.

The wavelength-selective light-shielding element 6 is applied, in lieu of the wavelength-selective light-shielding element 1, to the optical head 2 having a similar configuration except that a light source which emits linear polarized light beams of three wavelengths; namely, a wavelength $\lambda_3$ (e.g., a 400-nanometer band for a high-density optical disk), a wavelength $\lambda_1$ (e.g. a 650-nanometer band for a DVD), and a wavelength $\lambda_2$ (a 785-nanometer band for a CD), is used as the light source. As a result, the optical head can be used as an optical element that performs the function of blocking light beams of two different wavelengths $\lambda_1$ and $\lambda_3$. Further, light-shielding function and a ray path for each of the two light beams of two wavelengths $\lambda_1$ and $\lambda_3$ to be blocked can be optimally, independently set.

The multilayered structure consisting of the wavelength-selective light-shielding element 1 of the first embodiment and the wavelength-selective light-shielding element 5 of the second embodiment has been described herein. However, there may also be adopted a multilayer configuration consisting of the plurality of wavelength-selective light-shielding elements 1 of the first embodiment or the plurality of wavelength-selective light-shielding elements 5 of the second embodiment. Moreover, there may also be adopted a multilayer configuration consisting of the wavelength-selective light-shielding element 6 of the third embodiment and the wavelength-selective light-shielding element 1 of the first embodiment or the wavelength-selective light-shielding element 5 of the second embodiment.

As described above, the wavelength-selective light-shielding element of the fourth embodiment is applied to an optical pickup device for reproducing data in a CD, a DVD, or a high-density DVD, thereby enabling enhancement of the accuracy of reproduction achieved at the time of reproduction of data in a DVD having a plurality of recording layers or in a high-density DVD and enhancement of the ratio of utilization of light at the time of reproduction of data in a CD.

INDUSTRIAL APPLICABILITY

As mentioned above, a wavelength-selective light-shielding element of the present invention yields an advantage of the ability to block circularly-polarized light beams that rotate in a specific direction and that have wavelengths in a specific range, and is effective as an optical element, or the like.

The invention claimed is:

1. A wavelength-selective light-shielding element, comprising:
a transparent substrate; and
a light-shielding region provided in a portion of the transparent substrate, the light-shielding region permitting passage of a first circularly-polarized light rotating in a first direction regardless of a wavelength, blocking a portion of a second circularly-polarized light whose wavelength falls within a predetermined range in the second circularly-polarized light rotating in a second direction opposite the first direction, and permitting passage of the second circularly-polarized light falling outside the predetermined range,
wherein the light-shielding region is a reflection region which reflects the portion of the second circularly-polarized light whose wavelength falls within the predetermined range.

2. The wavelength-selective light-shielding element according to claim 1, wherein the reflection region is formed of a cholesteric phase liquid crystal material.

3. The wavelength-selective light-shielding element according to claim 2, wherein the reflection region reflects light beams included in a reflection wavelength region having
a center frequency $\lambda_c = \{(n_o+n_e)/2\} \times P$
a wavelength bandwidth $\Delta\lambda = (n_e-n_o) \times P$
where $n_o$=an ordinary refractive index of cholesteric phase liquid crystal
$n_e$=an extraordinary refractive index of cholesteric phase liquid crystal
P=a helical pitch of cholesteric phase liquid crystal.

4. A wavelength-selective light-shielding element comprising the wavelength-selective light-shielding element according to claim 1 in a plurality in a laminated fashion.

5. The wavelength-selective light-shielding element according to claim 1, wherein the predetermined range of the wavelength includes 660 nm and excludes 785 nm.

6. An optical head comprising:
a light source;
a collimator lens which collimates a light-source light emitted from the light source;
an objective lens which converges a light to a recording layer of an optical disk;
a beam splitter which is positioned in an optical path for the light-source light between the light source and the collimator lens and which deflects and separates a light reflected by the recording layer to an optical path differing from an optical path along which the light-source light reaches the recording layer;
a photodetector which detects the light deflected and separated by the beam splitter; and
the wavelength-selective light-shielding element according to claim 1, the wavelength-selective light-shielding element being positioned in an optical path between the collimator lens and the objective lens.

7. An optical head comprising:
a light source;
a collimator lens which collimates a light-source light emitted from the light source;
an objective lens which converges a light to a recording layer of an optical disk;
a beam splitter which is positioned in an optical path for the light-source light between the light source and the collimator lens and which deflects and separates a light reflected by the recording layer to an optical path differing from an optical path along which the light-source light reaches the recording layer;
a photodetector which detects the light deflected and separated by the beam splitter; and
a wavelength-selective light-shielding element comprising a transparent substrate and a light-shielding region provided in a portion of the transparent substrate,
wherein the light-shielding region permits passage of a first circularly-polarized light rotating in a first direction regardless of a wavelength, blocks a portion of a second circularly-polarized light whose wavelength falls within a predetermined range in the second circularly-polarized light rotating in a second direction opposite the first direction, and permits passage of the second circularly-polarized light falling outside the predetermined range, the light source is configured to emit a linearly-polarized light as the light-source light, and the optical head further comprises a phase modulation element positioned in an optical path between the beam splitter and the wavelength-selective light-shielding element and configured to convert the light-source light into a circularly-polarized light.

8. The optical head according to claim 7, wherein the light-shielding region is a reflection region which reflects the portion of the second circularly-polarized light whose wavelength falls within the predetermined range.

9. The optical head according to claim 8, wherein the reflection region is formed of a cholesteric phase liquid crystal material.

10. The optical head according to claim 9, wherein the reflection region reflects light beams included in a reflection wavelength region having
a center frequency $\lambda_c = \{(n_o+n_e)/2\} \times P$
a wavelength bandwidth $\Delta\lambda = (n_e-n_o) \times P$
where $n_o$=an ordinary refractive index of cholesteric phase liquid crystal
$n_e$=an extraordinary refractive index of cholesteric phase liquid crystal
P=a helical pitch of cholesteric phase liquid crystal.

11. The optical head according to claim 7, wherein the predetermined range of the wavelength includes 660 nm and excludes 785 nm.

* * * * *